US012670714B2

(12) United States Patent
Latapie et al.

(10) Patent No.: US 12,670,714 B2
(45) Date of Patent: Jun. 30, 2026

(54) OBJECT INTERACTION DETECTION AND INFERENCES USING SEMANTIC LEARNING

(71) Applicant: Cisco Technology, Inc., San Jose, CA (US)

(72) Inventors: Hugo Latapie, Long Beach, CA (US); Ozkan Kilic, Long Beach, CA (US); Adam James Lawrence, Pasadena, CA (US); Gaowen Liu, Austin, TX (US); Andrew Albert Pletcher, Scotts Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 17/551,407

(22) Filed: Dec. 15, 2021

(65) Prior Publication Data

US 2023/0186626 A1 Jun. 15, 2023

(51) Int. Cl.
| | |
|---|---|
| *G06V 20/70* | (2022.01) |
| *G06T 7/292* | (2017.01) |
| *G06T 7/70* | (2017.01) |
| *G06V 10/70* | (2022.01) |
| *G06V 20/40* | (2022.01) |
| *G06V 20/52* | (2022.01) |

(52) U.S. Cl.
CPC .............. *G06V 20/41* (2022.01); *G06T 7/70* (2017.01); *G06V 10/70* (2022.01); *G06T 2207/10016* (2013.01)

(58) Field of Classification Search
CPC ........ G06V 20/41; G06V 10/70; G06V 20/70; G06V 40/103; G06V 20/52; G06T 7/70; G06T 2207/10016; G06T 2207/20084; G06T 7/292

USPC .......................................................... 382/103
See application file for complete search history.

(56) References Cited

U.S. PATENT DOCUMENTS

| | | | |
|---|---|---|---|
| 10,887,197 B2 | 1/2021 | Fenoglio et al. | |
| 10,965,516 B2 | 3/2021 | Fenoglio et al. | |
| (Continued) | | | |

FOREIGN PATENT DOCUMENTS

| | | |
|---|---|---|
| CN | 107480578 A | 12/2017 |
| CN | 110472604 A | 5/2021 |
| WO | WO-2021011992 | 1/2021 |

OTHER PUBLICATIONS

Estevam et al. (Zero-Shot Action Recognition in Videos: A Survey, pub. 2020), (Year: 2020).*

(Continued)

*Primary Examiner* — Stephen S Hong
*Assistant Examiner* — Ahamed I Nazar
(74) *Attorney, Agent, or Firm* — Lee & Hayes, P.C.

(57) ABSTRACT

In one embodiment, a device converts video data into a set of tracklets, each tracklet representing a different object depicted in the video data. The device identifies a particular object depicted in the video data as being an attractor or repulsor with respect to one or more other objects depicted in the video data, based on an analysis of their respective tracklets. The device makes, using a semantic reasoning engine, an inference about the video data, based in part on the particular object being identified as an attractor or repulsor. The device provides data based on the inference for display.

20 Claims, 13 Drawing Sheets

TRACKLET INTERACTION ANALYSIS 1006

T_a → T 1002

T_b → T 1004

(56) References Cited

U.S. PATENT DOCUMENTS

| | | | | |
|---|---|---|---|---|
| 2009/0153661 | A1* | 6/2009 | Cheng | G06V 20/52 |
| | | | | 348/143 |
| 2014/0372348 | A1 | 12/2014 | Lehmann et al. | |
| 2016/0140984 | A1 | 5/2016 | Cecchi et al. | |
| 2018/0374233 | A1* | 12/2018 | Zhou | G06F 18/22 |
| 2020/0118682 | A1* | 4/2020 | Villazón-Terrazas | |
| | | | | G06N 20/00 |
| 2021/0042532 | A1 | 2/2021 | Latapie et al. | |
| 2021/0045360 | A1* | 2/2021 | Harvey | G08B 21/18 |
| 2021/0174155 | A1 | 6/2021 | Smith et al. | |
| 2021/0279615 | A1 | 9/2021 | Latapie et al. | |
| 2023/0052573 | A1* | 2/2023 | Gnanasambandam | |
| | | | | G16H 15/00 |
| 2023/0059673 | A1* | 2/2023 | Latapie | G06N 5/045 |

OTHER PUBLICATIONS

Patel et al. Video Representation and Suspicious Event Detection using Semantic Technologies, pp. 1-25, Pub. 2020 (Year: 2020).*
Patel et al. (Video Representation and Suspicious Event Detection using Semantic Technologies, published Mar. 9, 2021, pp. 1-25 ) (Year: 2021).*
Estevam et al. (Zero-Shot Action Recognition in Videos—A Survey, published Nov. 2020, pp. 1-24) (Year: 2020).*
Agrawal, et al., "VQA: Visual Question Answering", Proceedings of the IEEE International Conference on Computer Vision (ICCV), 2015, 25 pages, arXiv:1505.00468v7 [cs.CL].
Aleksander, Igor, "Machine consciousness" In Scholarpedia. 3(2):4162, Oct. 21, 2011, 7 pages.
Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.
Baudrillard, Jean, "Simulacra and Simulation", 1981, 159 pages, Galilee.
Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.
Bělohlávek, Radim, "Concept lattices and order in fuzzy logic", Annals of Pure and Applied Logic 128 (2004) 277-298, Elsevier.
Box, G. E. P., "Science and Statistics", In Journal of the American Statistical Association, 71(356), Dec. 1976, pp. 791-799.
Chalmers, David J., "The Conscious Mind: In Search of a Fundamental Theory", 1996, 433 pages, Oxford University Press, New York.
Chella, et al., "A cognitive framework for imitation learning", Robotics and Autonomous Systems 54, Mar. 2006, pp. 403-408, Elsevier.
Chella, et al., "Artificial Consciousness", Chapter 20, In Perception-Action Cycle, 2011, pp. 637-671, Springer, New York.
Chella, et al., "Machine Consciousness: A Manifesto for Robotics", In International Journal of Machine Consciousness, 1(1), Jun. 2009, pp. 33-51, World Scientific Publishing Company.
Cohen, Paul R., "Projections as Concepts", Computer Science Department Faculty Publication Series (194), https://scholarworks. umass.edu/cs/_faculty/_pubs/194, 1997, 6 pages, University of Massachusetts, Amherst.
Cui, et al., "A survey on network embedding", IEEE Transactions on Knowledge and Data Engineering, vol. 31, Issue: 5, May 1, 2019, pp. 833-852, IEEE.
De Bono, Edward, "The Mechanism of Mind", 1967, 276 pages, Penguin Books.
Düntsch, et al., "Modal-style operators in qualitative data analysis", 2002 IEEE International Conference on Data Mining, 2002. Proceedings, Dec. 2002, pp. 155-162, IEEE, Maebashi City, Japan.
Franco, et al., "Grocery product detection and recognition", Expert Systems With Applications 81 (2017), pp. 163-176, Elsevier Ltd.
George, et al., "Recognizing Products: A Per-exemplar Multi-label Image Classification Approach", ECCV 2014, Part II, LNCS 8690, 2014, pp. 440-455, Springer International Publishing Switzerland.
Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.
Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.
Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.
Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.
Hamilton, et al., "Representation Learning on Graphs: Methods and Applications", Bulletin of the IEEE Computer Society Technical Committee on Data Engineering, 2017, 23 pages, IEEE.
Hammer, et al., "A Reasoning Based Model for Anomaly Detection in the Smart City Domain", IntelliSys 2020, AISC 1251, pp. 144-159, 2021, Springer Nature Switzerland AG.
Hobbs, Jerry R., "Granularity", In Proceedings of the Ninth International Joint Conference on Artificial Intelligence, 1985, pp. 432-435, Morgan Kaufmann.
Horowitz, Alexandra, "Smelling themselves: Dogs investigate their own odours longer when modified in an "olfactory mirror" test", Behavioural Processes, 2017, 41 pages.
Johnson, Mark, "The Body in The Mind", 1987, 268 pages, The University of Chicago Press.
Kiryati, et al., "A probabilistic Hough transform", Pattern Recognition. 24(4), 1991, pp. 303-316, The Pattern Recognition Society.
Korzybski, Alfred, "Manhood Of Humanity, The Science and Art of Human Engineering", 1921, 240 pages, E. P. Dutton & Company, New York, NY.
Korzybski, Alfred, "Science and Sanity: An Introduction to Non-Aristotelian Systems and General Semantics", 5th Edition, 1994, 910 pages, Institute of General Semantics, New York, NY.
Korzybski, Alfred, "Videos—This Is Not That", online: https://www.thisisnotthat.com/korzybski-videos/, accessed Nov. 18, 2021, 7 pages.
Lakoff, G., "Women, Fire, and Dangerous Things", 1984, 631 pages, University of Chicago Press.
Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.
Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Patel, et al., "Video Representation and Suspicious Event Detection Using Semantic Technologies", online: http://semantic-web-journal.

(56)           References Cited

OTHER PUBLICATIONS net/system/files/swj2427.pdf, Semantic Web 0, Sep. 10, 2020, accessed Aug. 9, 2021, 25 pages, IOS Press.

Pauli, Wolfgang, "Part I. General: (A) theory. Some relations between electrochemical behaviour and the structure of colloids", Jan. 1935, pp. 11-27, Transactions of the Faraday Society, vol. 1.

Scarselli, et al., "The Graph Neural Network Model", IEEE Transactions on Neural Networks (vol. 20, Issue: 1, Jan. 2009), pp. 61-80, IEEE.

Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "Codam: A neural network model of consciousness", Neural Networks 20 (2007), pp. 983-992, Elsevier Ltd.

Thomopoulous, Stelios C.A., "Risk Assessment and Automated Anomaly Detection Using a Deep Learning Architecture", online: https://www.intechopen.com/chapters/75329, accessed Dec. 14, 2021, 30 pages, IntechOpen.

Thórisson, et al., "Cumulative Learning", Artificial General Intelligence—12th International Conference, AGI 2019, Proceedings, pp. 198-208, Springer.

Thórisson, Kristinn R., "A New Constructivist AI: From Manual Methods to Self-Constructive Systems", Chapter 9, Apr. 2012, pp. 147-174, Atlantis Press Book.

Thórisson, Kristinn R., "Integrated AI Systems", Minds & Machines 17, Mar. 2007, pp. 11-25.

Tonioni, et al., "Product recognition in store shelves as a sub-graph isomorphism problem", online: https://arxiv.org/abs/1707.08378, Sep. 2017, 14 pages.

Unger, et al., "The Singular Universe and the Reality of Time: A Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, et al. "Self in NARS, an AGI System", vol. 5, Article 20, Mar. 2018, 15 pages, Frontiers in Robotics and AI.

Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: An Approach Based on Heirarchies of Concepts", I. Rival (Ed.), Ordered Sets, 1982, pp. 314-339.

Yao, et al., "A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

OBJECT INTERACTION DETECTION AND INFERENCES USING SEMANTIC LEARNING

TECHNICAL FIELD

The present disclosure relates generally to computer networks, and, more particularly, to object detection and inferences using semantic learning.

BACKGROUND

There are many environments consisting of large numbers of physically interacting objects such as people, vehicles, bicycles, robots, and the like. For instance, example environments of this type may include crowded bus stops, roadways, train stations, airports, stadiums, etc. To this day, many thousands of people are injured or even killed due to the inability to detect early indications of potentially dangerous interactions between such objects. In some instances, this can even avalanche into even more dangerous conditions, such as a fight between two people escalating into a brawl.

With the advent of machine learning, recent efforts have been made to detect certain conditions within surveillance footage. However, highly complex systems such as crowds, traffic, etc. are notoriously hard to model. In addition, any such model will be limited in its capabilities by the training data on which it is trained. Indeed, systems that simply seek to match known patterns are often ineffectual at identifying conditions outside of their training datasets. Traditional machine learning also suffers from a lack of explainability, meaning that a system that detects a condition also cannot explain why it reached that conclusion.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
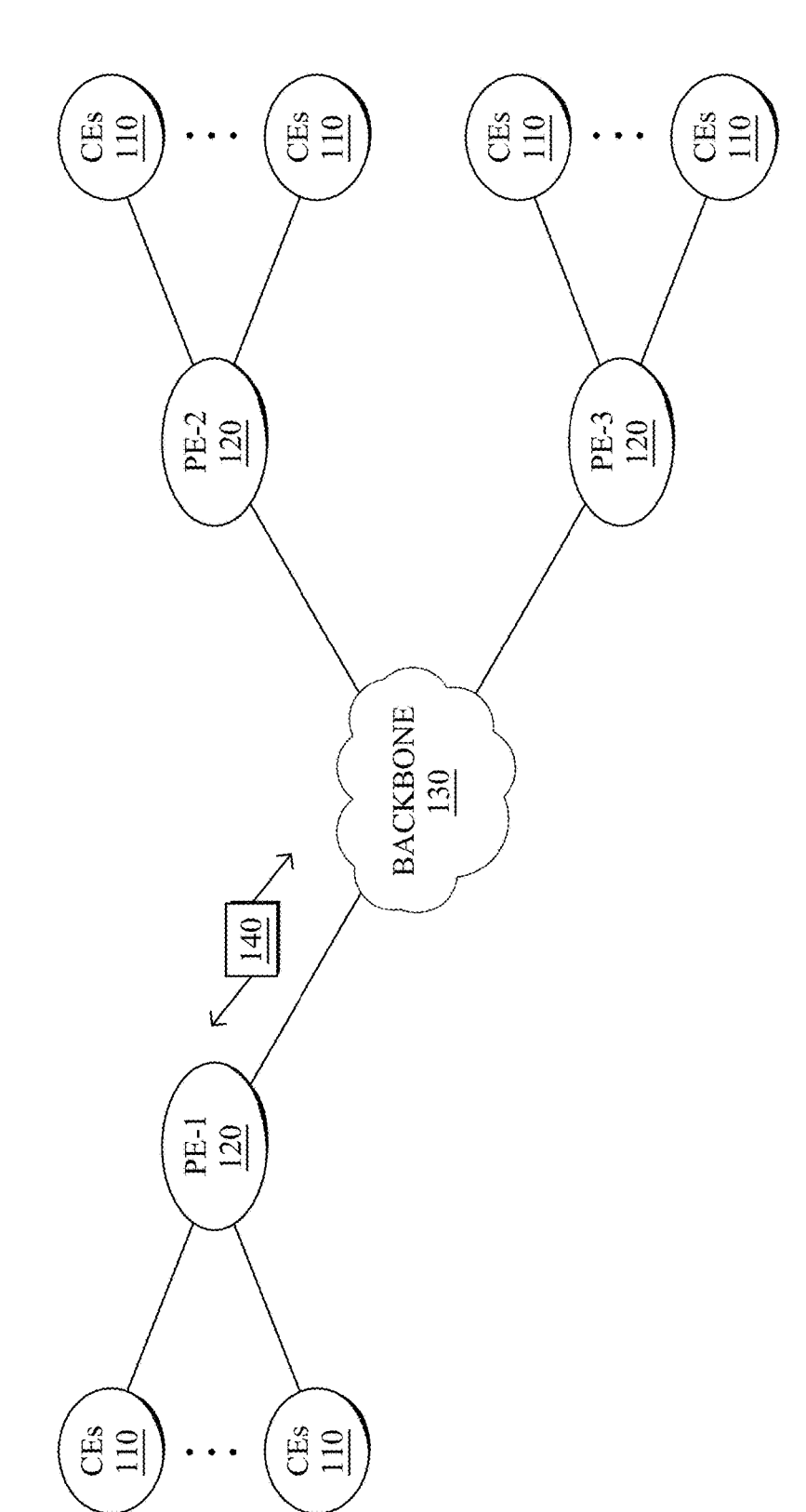
FIGS. 1A-1B illustrate an example computer network.

According to one or more embodiments of the disclosure, a device converts video data into a set of tracklets, each tracklet representing a different object depicted in the video data. The device identifies a particular object depicted in the video data as being an attractor or repulsor with respect to one or more other objects depicted in the video data, based on an analysis of their respective tracklets. The device makes, using a semantic reasoning engine, an inference about the video data, based in part on the particular object being identified as an attractor or repulsor. The device provides data based on the inference for display.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
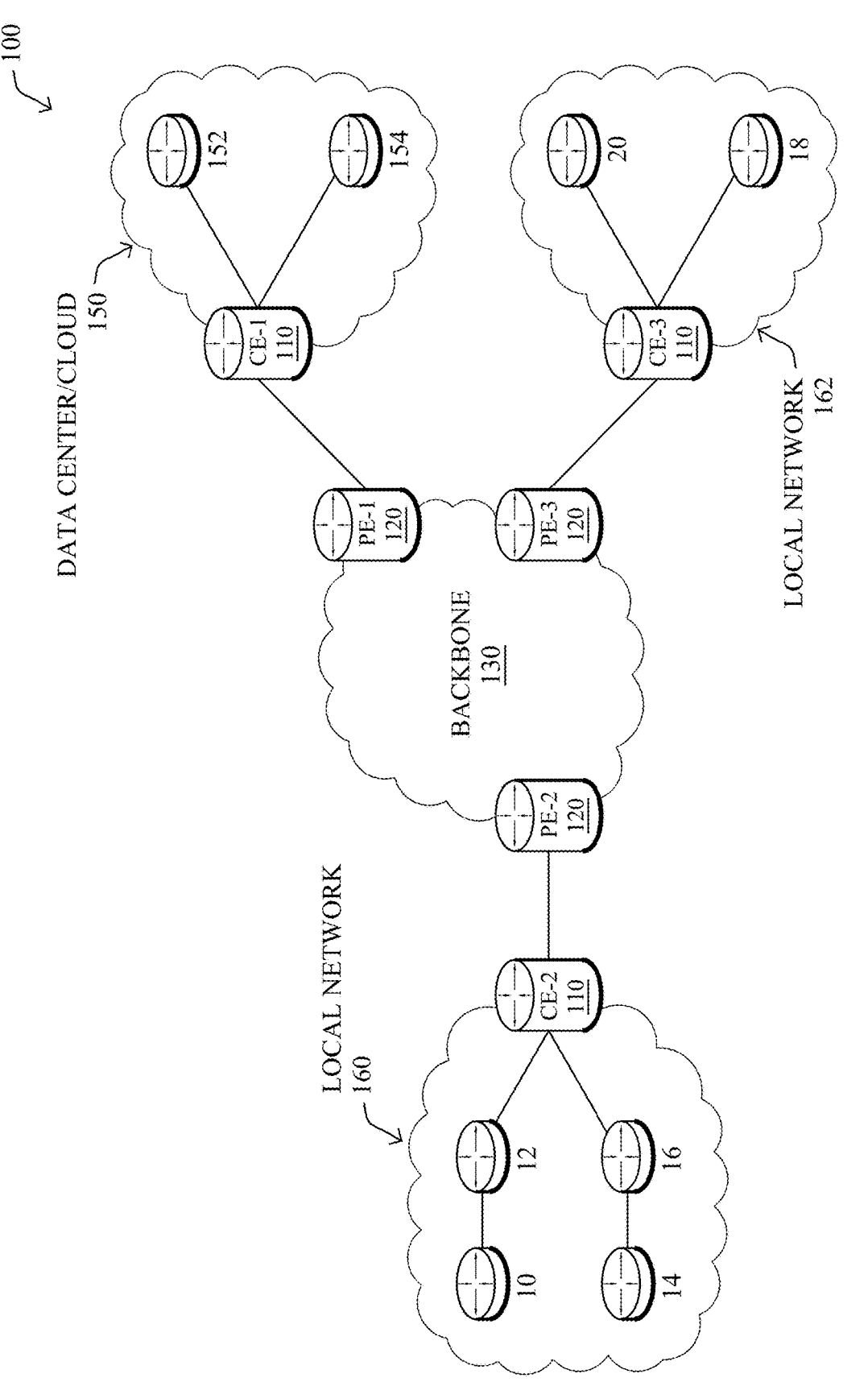

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment).

In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
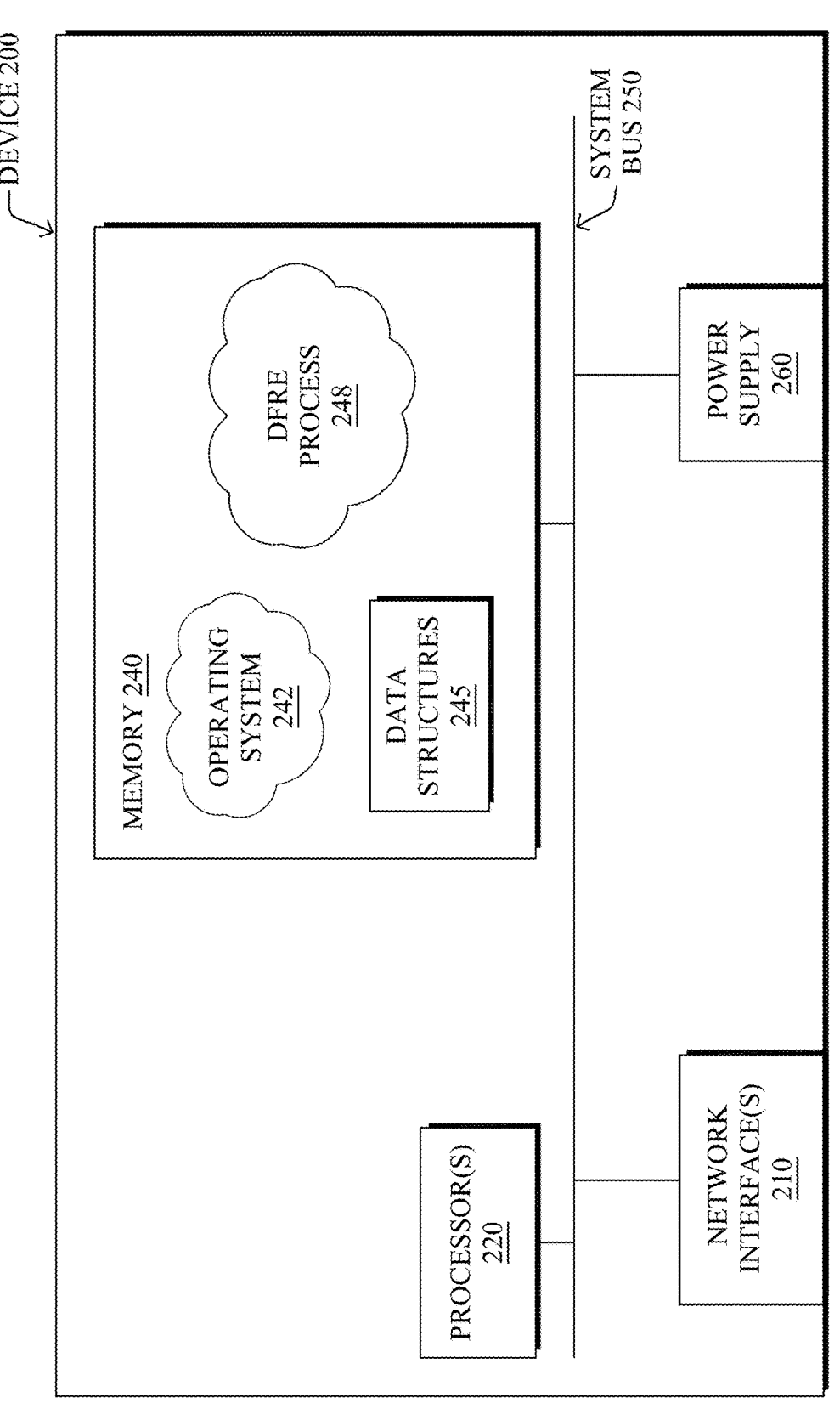
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to provide cognitive reasoning services to a network. In various embodiments, DFRE process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
FIG. 3 illustrates an example hierarchy for a deep fusion reasoning engine (DFRE)
Figure 3:
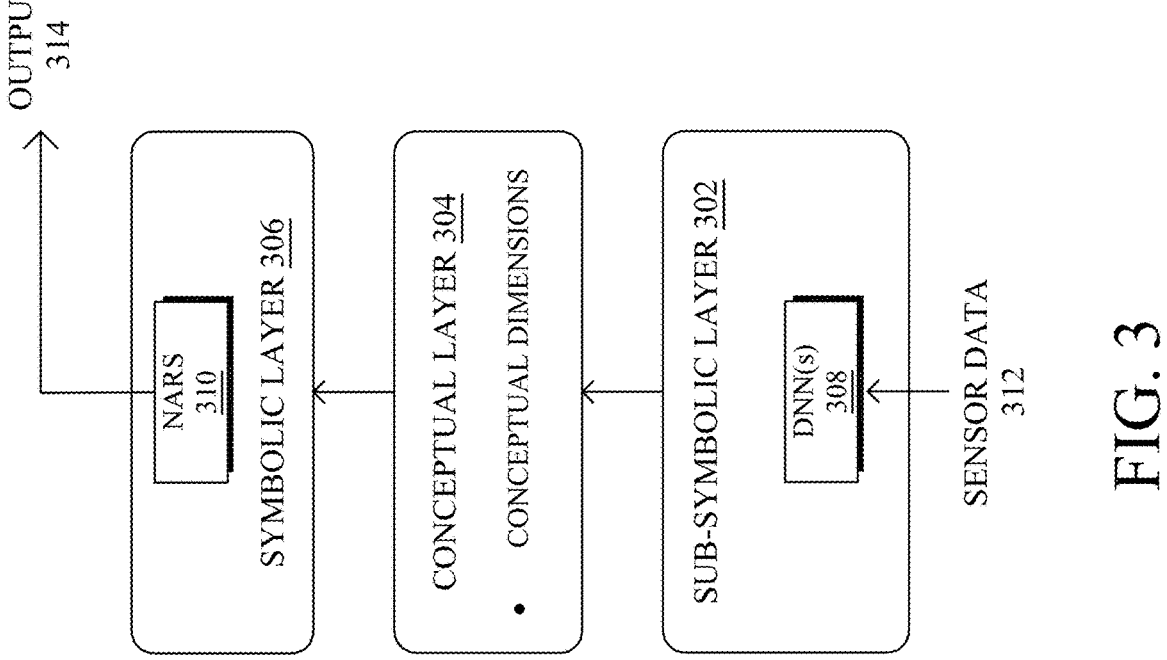

According to various embodiments, FIG. 3 illustrates an example hierarchy 300 for a deep fusion reasoning engine (DFRE). For example, DFRE process 248 shown in FIG. 2 may execute a DFRE for any number of purposes. In particular, DFRE process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for visual programming.

In general, a reasoning engine, also known as a 'semantic reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a DFRE is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized,"

which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

In other words, a DFRE generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Figure 4:
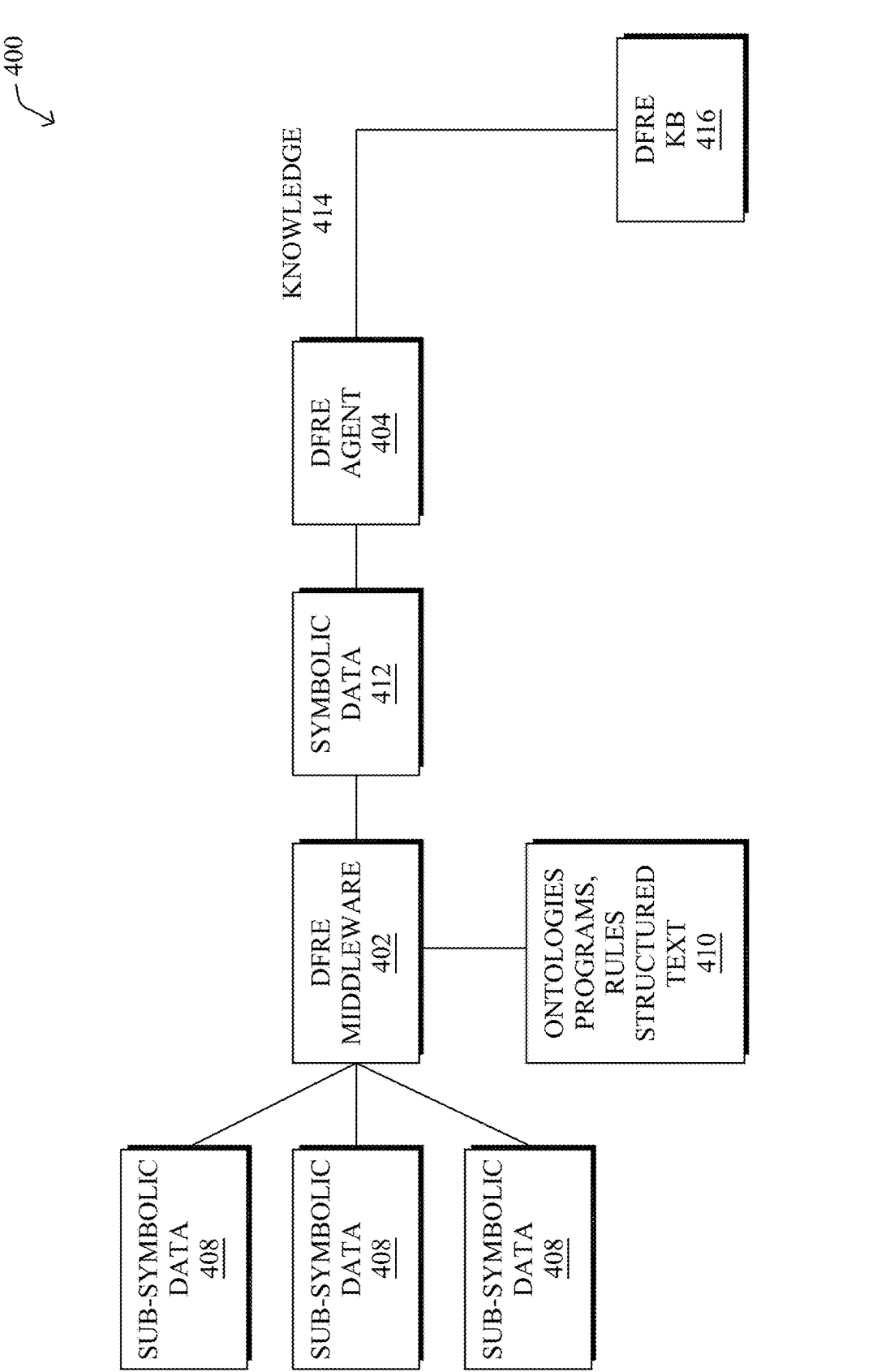
FIG. 4 illustrates an example DFRE architecture.

According to various embodiments, FIG. 4 illustrates an example DFRE architecture 400. As shown, architecture 400 may be implemented across any number of devices or fully on a particular device, as desired. At the core of architecture 400 may be DFRE middleware 402 that offers a collection of services, each of which may have its own interface. In general, DFRE middleware 402 may leverage a library for interfacing, configuring, and orchestrating each service of DFRE middleware 402.

In various embodiments, DFRE middleware 402 may also provide services to support semantic reasoning, such as by an AIKR reasoner. For example, as shown, DFRE middleware 402 may include a NARS agent that performs semantic reasoning for structural learning. In other embodiments, OpenCog or another suitable AIKR semantic reasoner could be used.

One or more DFRE agents 404 may interface with DFRE middleware 402 to orchestrate the various services available from DFRE middleware 402. In addition, DFRE agent 404 may feed and interact with the AIKR reasoner so as to populate and leverage a DFRE knowledge graph with knowledge.

More specifically, in various embodiments, DFRE middleware 402 may obtain sub-symbolic data 408. In turn, DFRE middleware 402 may leverage various ontologies, programs, rules, and/or structured text 410 to translate sub-symbolic data 408 into symbolic data 412 for consumption by DFRE agent 404. This allows DFRE agent 404 to apply symbolic reasoning to symbolic data 412, to populate and update a DFRE knowledge base (KB) 416 with knowledge 414 regarding the problem space (e.g., the network under observation, etc.). In addition, DFRE agent 404 can leverage the stored knowledge 414 in DFRE KB 416 to make assessments/inferences.

For example, DFRE agent 404 may perform semantic graph decomposition on DFRE KB 416 (e.g., a knowledge graph), so as to compute a graph from the knowledge graph of KB 416 that addresses a particular problem. DFRE agent 404 may also perform post-processing on DFRE KB 416, such as performing graph cleanup, applying deterministic rules and logic to the graph, and the like. DFRE agent 404 may further employ a definition of done, to check goals and collect answers using DFRE KB 416.

In general, DFRE KB 416 may comprise any or all of the following:
Data
Ontologies
Evolutionary steps of reasoning
Knowledge (e.g., in the form of a knowledge graph)
The Knowledge graph also allows different reasoners to:
    Have their internal subgraphs
    Share or coalesce knowledge
    Work cooperatively In other words, DFRE KB 416 acts as a dynamic and generic memory structure. In some embodiments, DFRE KB 416 may also allow different reasoners to share or coalesce knowledge, have their own internal sub-graphs, and/or work collaboratively in a distributed manner. For example, a first DFRE agent 404 may perform reasoning on a first sub-graph, a second DFRE agent 404 may perform reasoning on a second sub-graph, etc., to evaluate the health of the network and/or find solutions to any detected problems. To communicate with DFRE agent 404, DFRE KB 416 may include a bidirectional Narsese interface or other interface using another suitable grammar.

In various embodiments, DFRE KB 416 can be visualized on a user interface. For example, Cytoscape, which has its building blocks in bioinformatics and genomics, can be used to implement graph analytics and visualizations.

Said differently, DFRE architecture 400 may include any or all of the following the following components:
DFRE middleware 402 that comprises:
    Structural learning component
    JSON, textual data, ML/DL pipelines, and/or other containerized services (e.g., using Docker)
    Hierarchical goal support
DFRE Knowledge Base (KB) 416 that supports:
    Bidirectional Narseseese interface
    Semantic graph decomposition algorithms
    Graph analytics
    Visualization services
DFRE Agent 404
    DFRE Control System
More specifically, in some embodiments, DFRE middleware 402 may include any or all of the following:
Subsymbolic services:
    Data services to collect sub-symbolic data for consumption
Reasoner(s) for structural learning
NARS
OpenCog Optimized hierarchical goal execution
Probabilistic programming
Causal inference engines
Visualization Services (e.g., Cytoscape, etc.)

DFRE middleware 402 may also allow the addition of new services needed by different problem domains.

Figure 5:
FIG. 5 illustrates an example of various inference types.
Figure 5:
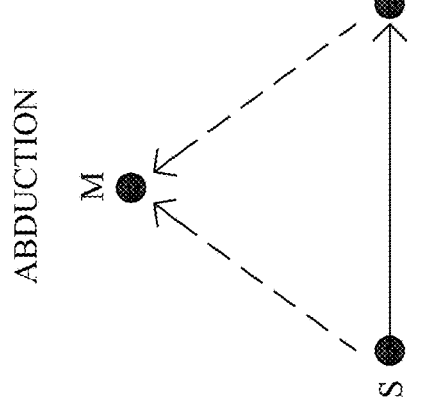
Figure 5:
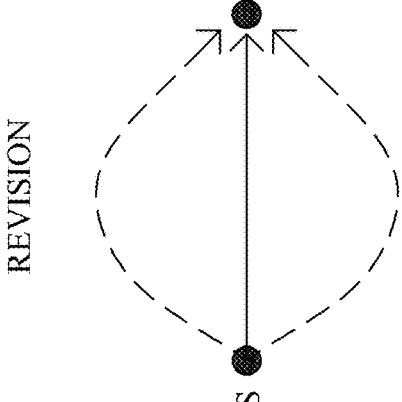
Figure 5:
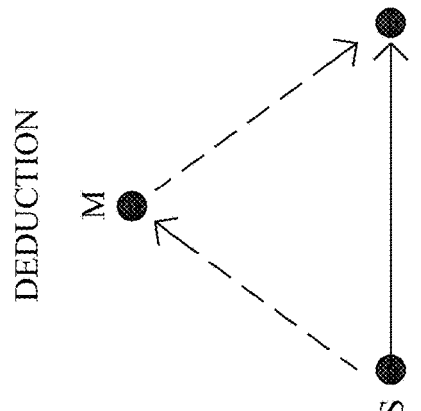
Figure 5:
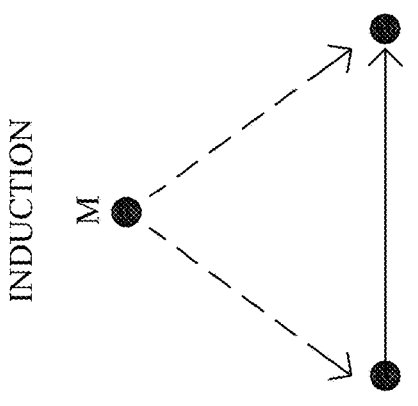
Figure 6:
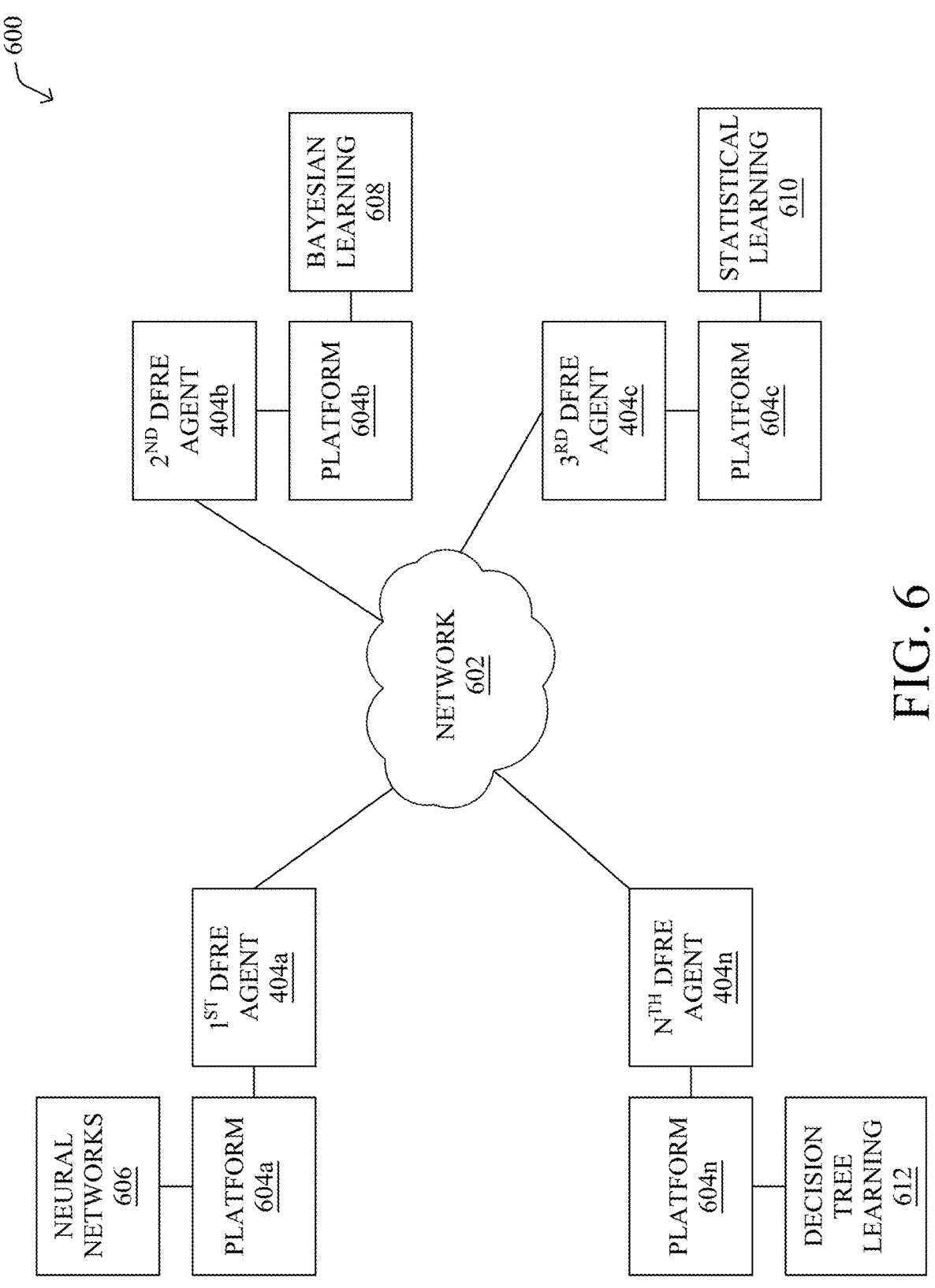
FIG. 6 illustrates an example architecture for multiple DFRE agents.

During execution, DFRE agent 404 may, thus, perform any or all of the following:
Orchestration of services
Focus of attention
Semantic graph decomposition
Addresses combinatorial issues via an automated divide and conquer approach that works even in non-separable problems because the overall knowledge graph 416 may allow for overlap.
Feeding and interacting with the AIKR reasoner via bidirectional translation layer to the DFRE knowledge graph.
Call middleware services
Post processing of the graph
Graph clean-up
Apply deterministic rules and logic to the graph
Definition of Done (DoD)
Check goals and collect answers FIG. 5 illustrates an example 500 showing the different forms of structural learning that the DFRE framework can employ. More specifically, the inference rules in example 500 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the DFRE may support any or all of the following:
Syllogistic Logic
Logical quantifiers
Various Reasoning Types
Deduction Induction
Abduction
Induction
Revision
Different Types of Inference
Local inference
Backward inference To address combinatorial explosion, the DFRE knowledge graph may be partitioned such that each partition is processed by one or more DFRE agents 404, as shown in architecture 600 in FIG. 6, in some embodiments. More specifically, any number of DFRE agents 404 (e.g., a first DFRE agent 404a through an $N^{th}$ DFRE agent 404n) may be executed by devices connected via a network 602 or by the same device. In some embodiments, DFRE agents 404a-404n may be deployed to different platforms (e.g., platforms 604a-604n) and/or utilize different learning approaches. For instance, DFRE agent 404a may leverage neural networks 606, DFRE agent 404b may leverage Bayesian learning 608, DFRE agent 404c may leverage statistical learning, and DFRE agent 404n may leverage decision tree learning 612.

As would be appreciated, graph decomposition can be based on any or all of the following:
Spatial relations—for instance, this could include the vertical industry of a customer, physical location (country) of a network, scale of a network deployment, or the like.
Descriptive properties, such as severity, service impact, next step, etc.

Graph-based components (isolated subgraphs, minimum spanning trees, all shortest paths, strongly connected components . . . )

Any new knowledge and related reasoning steps can also be input back to the knowledge graph, in various embodiments.

In further embodiments, the DFRE framework may also support various user interface functions, so as to provide visualizations, actions, etc. to the user. To do so, the framework may leverage Cytoscape, web services, or any other suitable mechanism.

Figure 7:
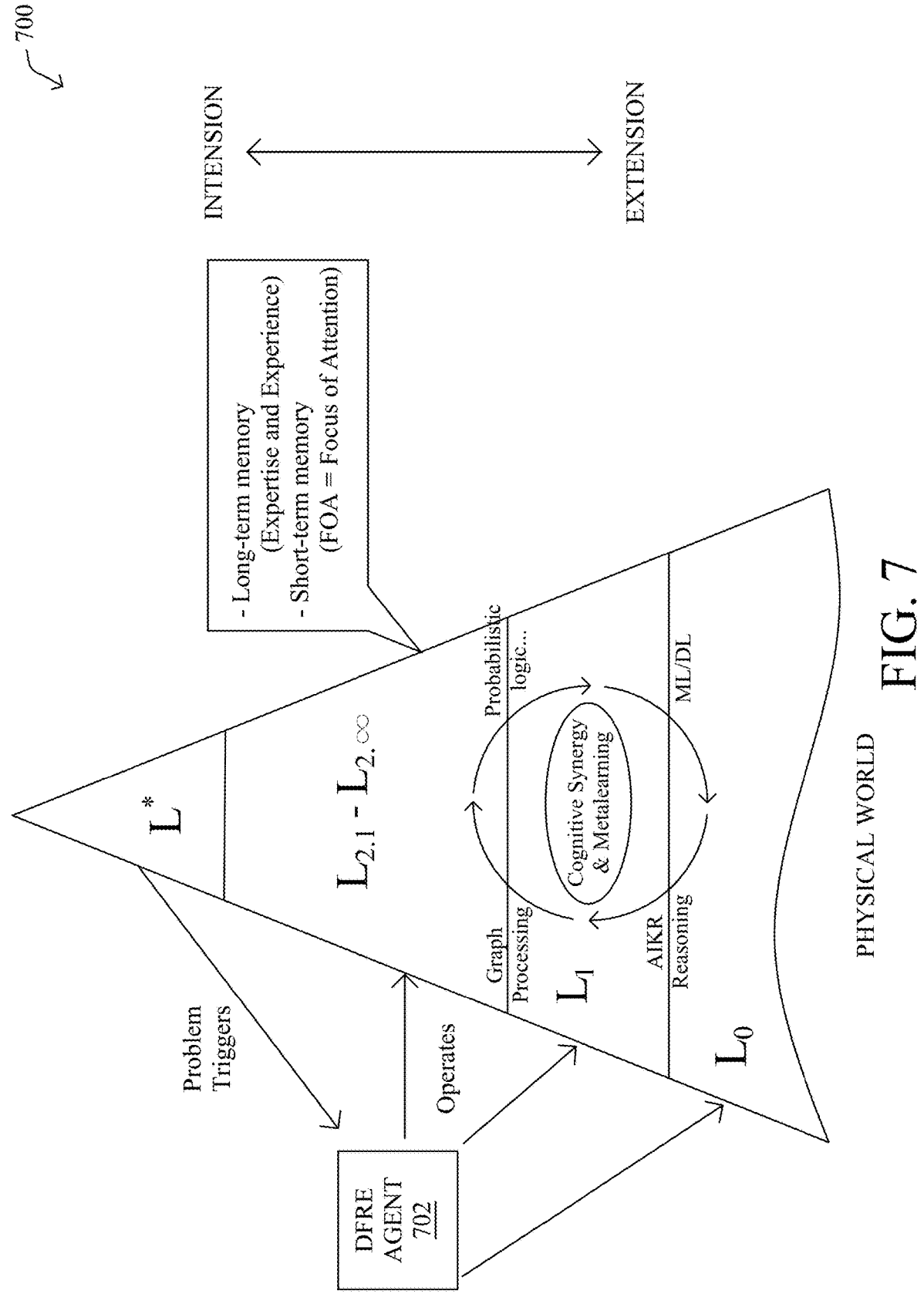
FIG. 7 illustrates an example DFRE metamodel.

At the core of the techniques herein is an artificial intelligence metamodel 700 for knowledge representation at different levels of abstraction, as shown in FIG. 7, according to various embodiments. In various embodiments, the DFRE knowledge graph groups information into four different levels, which are labeled $L_0$, $L_1$, $L_2$, and $L^*$ and represent different levels of abstraction, with $L_0$ being closest to raw data coming in from various sensors and external systems and $L_2$ representing the highest levels of abstraction typically obtained via mathematical means such as statistical learning and reasoning. $L^*$ can be viewed as the layer where high-level goals and motivations are stored. The overall structure of this knowledge is also based on anti-symmetric and symmetric relations.

One key advantage of the DFRE knowledge graph is that human level domain expertise, ontologies, and goals are entered at the $L_2$ level. This leads, by definition, to an unprecedented ability to generalize at the $L_2$ level thus minimizing the manual effort required to ingest domain expertise.

More formally:
$L^*$ represents the overall status of the abstraction. In case of a problem, it triggers problem solving in lower layers via a DFRE agent 702.
$L_{2.1}$-$L_{2.\infty}$=Higher level representations of the world in which most of concepts and relations are collapsed into simpler representations. The higher-level representations are domain-specific representations of lower levels.
$L_1$=has descriptive, teleological and structural information about $L_0$.
$L_0$=Object level is the symbolic representation of the physical world.

In various embodiments, $L_2$ may comprise both expertise and experience stored in long-term memory, as well as a focus of attention (FOA) in short-term memory. In other words, when a problem is triggered at $L^*$, a DFRE agent 702 that operates on $L_2$-$L_0$ may control the FOA so as to focus on different things, in some embodiments.

As would be appreciated, there may be hundreds of thousands or even millions of data points that need to be extracted at $L_0$. The DFRE's FOA is based on the abstraction and the DFRE knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), DFRE agent 702 can make evaluations regarding the particular system at different levels of extraction. Indeed, metamodel 700 may differ from a more traditional knowledge graph through the inclusion of any or all of the following, in various embodiments:

A formal mechanism to represent different levels of abstraction, and for moving up and down the abstraction hierarchy (e.g., ranging from extension to intension).

Additional structure that leverages distinctions/anti-symmetric relations, as the backbone of the knowledge structures.

Similarity/symmetric relation-based relations.

As noted above, there are many environments consisting of large numbers of physically interacting objects such as people, vehicles, bicycles, robots, and the like. For instance, example environments of this type may include crowded bus stops, roadways, train stations, airports, stadiums, etc. To this day, many thousands of people are injured or even killed due to the inability to detect early indications of potentially dangerous interactions between such objects. In some instances, this can even avalanche into even more dangerous conditions, such as a fight between two people escalating into a brawl.

With the advent of machine learning, recent efforts have been made to detect certain conditions within surveillance footage. However, highly complex systems such as crowds, traffic, etc. are notoriously hard to model. In addition, any such model will be limited in its capabilities by the training data on which it is trained. Indeed, systems that simply seek to match known patterns are often ineffectual at identifying conditions outside of their training datasets. Traditional machine learning also suffers from a lack of explainability, meaning that a system that detects a condition also cannot explain why it reached that conclusion.

—Object Interaction Detection and Inferences Using Semantic Learning—

The techniques herein allow for the deployment of a symbolic/sub-symbolic metamodel to detect object interactions and make inferences about those interactions using semantic learning. In some aspects, the techniques herein leverage the DFRE metamodel herein to detect interactions at the sub-symbolic level and reason about those interactions. For instance, the techniques herein can be used for purposes of monitoring a crowd, traffic, or other dynamic situations involving potentially hundreds, or even thousands, of objects.

Illustratively, the techniques described herein may be performed by hardware, software, and/or firmware, such as in accordance with the DFRE process 248, which may include computer executable instructions executed by the processor 220 (or independent processor of interfaces 210), to perform functions relating to the techniques described herein.

Specifically, according to various embodiments, a device converts video data into a set of tracklets, each tracklet representing a different object depicted in the video data. The device identifies a particular object depicted in the video data as being an attractor or repulsor with respect to one or more other objects depicted in the video data, based on an analysis of their respective tracklets. The device makes, using a semantic reasoning engine, an inference about the video data, based in part on the particular object being identified as an attractor or repulsor. The device provides data based on the inference for display.

Figure 8:
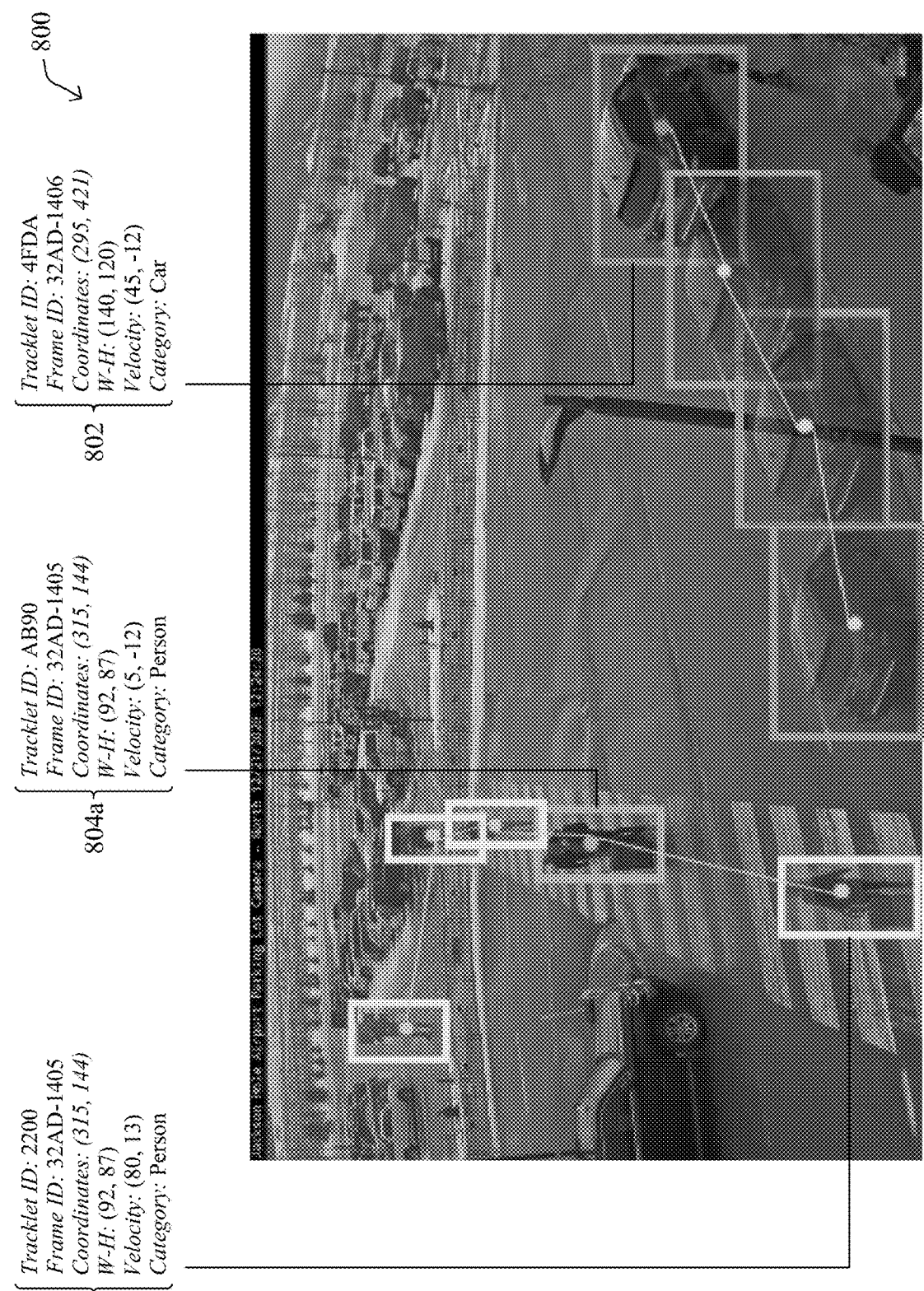
FIG. 8 illustrates an example of identifying tracklets from video data.

Operationally, FIG. 8 illustrates an example of identifying tracklets from video data 800, according to various embodiments. At its sub-symbolic layers, the DFRE metamodel may convert video data from any number of cameras into what are referred herein as tracklets. In general, a tracklet refers to a time series of n-number (typically two) dimensional points that can be associated with a bounding box for the video data and its underlying image across a fixed sample rate. For instance, the metamodel may utilize deep learning to apply bounding boxes to the input video data, to identify different objects depicted therein. In turn, the metamodel can track and associate the bounding boxes for a particular object over time.

In some embodiments, the DFRE metamodel may also determine various characteristics of an object associated with a tracklet. For instance, the DFRE metamodel may perform any or all of the following:

Identify the type category of the object (e.g., person, car, train, etc.)

Identify the coordinates of the depicted object

Identify the velocity of the object

Assign a unique Tracklet ID to the tracklet

Assign Frame IDs to the frames of the video data etc.

For instance, as shown, the metamodel may generate tracklet data 802 regarding a car depicted as moving along a roadway in the captured video data. Similarly, the metamodel may also generate tracklet data 804a-804b for a person crossing the roadway over time.

In some embodiments, another technique that the DFRE metamodel may employ with respect to the video data is object reidentification. Generally, this technique allows the metamodel to associate a particular object depicted in one video stream as being the same object depicted in another video stream. This can be particularly useful in cases in which the video feeds are from non-overlapping cameras. To do so, the metamodel may leverage any number of object (e.g., person) re-identification deep learning models, to make these associations.

A further potential technique that the DFRE metamodel may perform with respect to captured video data is pose estimation, in some embodiments. In general, pose estimation entails the metamodel representing individuals as a set of bars and joints. For instance, the leg of a person can be represented as a conjunction of bars representing their femur and tibia/fibula, connected by a joint (knee). By analyzing the orientation, velocities, and behaviors of these bars and joints, the metamodel quickly identify different conditions of a person. For instance, the metamodel may identify conditions such as standing, falling, crawling, running, fighting, etc. Such information can also be associated with the tracklet(s) of the person, in some embodiments.

Figure 9:
FIG. 9 illustrates an example of using trackets to detect attractors and repulsors.
Figure 9:
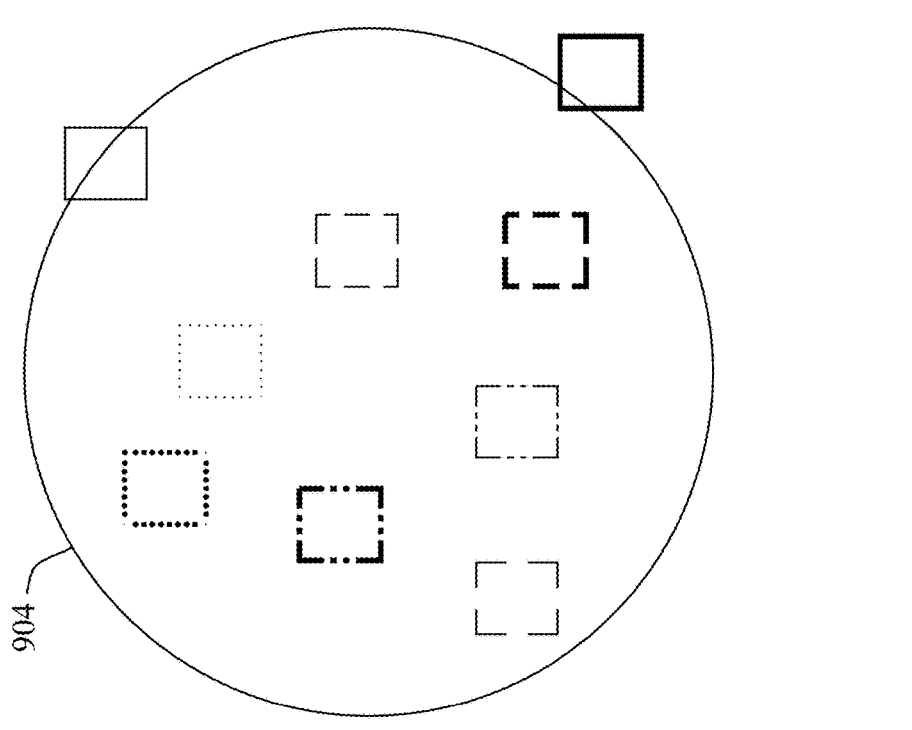

FIG. 9 illustrates an example of using tracklets to detect attractors and repulsors, according to various embodiments. As shown, assume that there is a set of tracklets 902 detected within a certain location (e.g., a stadium, bus station, airport, roadway, etc.), each of which is associated with a different object in that location. In such a case, the DFRE metamodel may assess tracklets 902 to determine whether any of them are attractors or repulsors.

Generally speaking, an attractor is an object to which other objects are moving. For instance, consider the case of a person in medical distress. In such a case, other people may rush to the aid of that person, thereby making them an attractor. Conversely, a repulsor is an object away from which other objects are moving. For instance, people may run away from a burning vehicle or other objects that represent threats.

In some embodiments, to detect attractors and repulsors, the DFRE metamodel may find all neighbors of a particular tracklet within a certain radius. For instance, the metamodel may identify tracklets 902 within a radius 904 for analysis. In turn, the metamodel may compute the relative velocities of all of tracklets 902 per each possible center tracklet 902, denoted VR. In addition, the metamodel may also compute the inter-tracklet vector IT. If the product of any VR and IT is greater than zero, then the two tracklets are moving away from each other. Conversely, if the product is less than zero, then the two tracklets are moving towards each other. This allows the metamodel to analyze and reason on the various types of interactions possible between the objects, such as fights, medical issues, stampedes, and the like.

Figure 10:
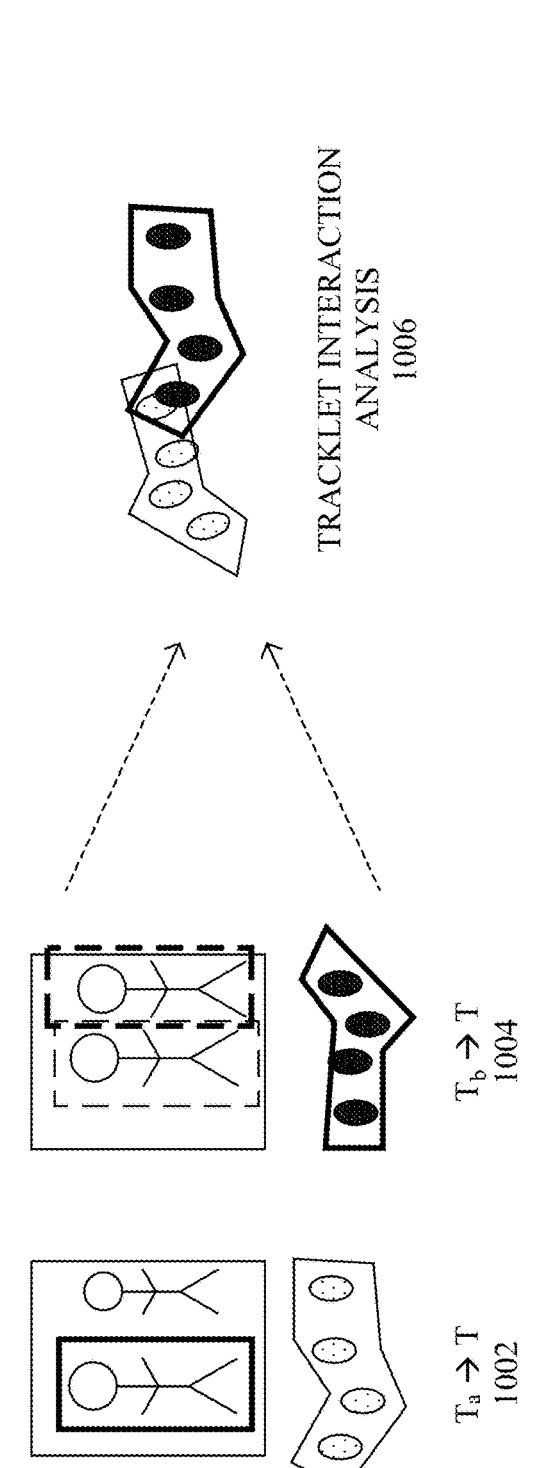
FIG. 10 illustrates an example of analyzing the interactions between tracklets.

FIG. 10 illustrates an example 1000 of analyzing the interactions between tracklets, according to various embodiments. As shown, assume that there is a first tracklet 1002 representing a first person and a second tracklet 1004 representing a second person. In such a case, the metamodel may perform tracklet interaction analysis 1006, to categorize the interaction. For instance, say the person associated with tracklet 1004 moves towards that of tracklet 1002 over time, making the person associated with tracklet 1002 an attractor. In turn, the two people may then begin walking in parallel next to one another. By looking at the relative velocities, orientations, directions, changes in behavior, or the like, the system can use its semantic reasoning engine at its symbolic layers to make inferences about the video data and the conditions present in the area. In some instances, the system can also make inferences/predictions about future events, such as by identifying precursors to a brawl, stampede, etc.

Figure 11:
FIG. 11 illustrates an example user interface showing inferences made about a crowd.

FIG. 11 illustrates an example user interface 1100 showing inferences made about a crowd, according to various embodiments. As shown, user interface 1100 may include various video data 1102, either in raw form or some altered form (e.g., by including indicia of detected objects on still frames of the video, etc.). In addition, user interface 1100 may also include data 1104 regarding its inferences about the video data. For instance, the system may analyze the captured video data to detect any attractors or repulsors, assess the interactions of their associated tracklets, and use its semantic reasoning engine to make inferences about these interactions.

As shown, for example, assume that video data 1102 depicts two people whereby one person rapidly approaches another person and attacks him. By analyzing their respective tracklets, poses, and/or tracklet interactions, the semantic reasoning engine may match the behaviors to the concept of 'fight' in its knowledge graph. From this inference, the system may construct a timeline of events for display as part of data 1104. For instance, once the system has determined that a fight is occurring, it can rapidly apply person re-identification to its video data and make inferences about the timeline of events leading up to the fight. For instance, the two people may have had a prior, hostile interaction while waiting in line for the bathroom, which then lead up to the detected fight. Further inferences that the system may also make could include the prediction of future events, such as by assessing the behaviors of any bystanders, to predict whether the fight will escalate into a brawl involving even more people.

As would be appreciated, a key benefit of the neuro-symbolic metamodel approach herein is its potential support of zero-shot learning in which the system can make inferences about conditions and events on which it was not specifically trained. For instance, say the system uses a seed ontology comprising the concepts of 'standing' and 'running,' but then encounters video data of a person walking. Even without specific knowledge about the concept of walking, the semantic reasoning engine may determine that this is an intermediate state between standing and running, based on the velocities involved, the pose analysis of the person, etc. This allows the system to learn different conditions and make inferences about situations that it may not have seen before.

A further extension of the techniques herein relates to the metamodel-based system also relying on data from additional sources, in addition to the video data. For instance, the system could also leverage other forms of sensor data from sensors deployed to the monitored area, to further enhance its inferences. In other cases, the system could also perform queries of one or more remote systems, based on its inferences. For example, once the system has identified the attacker shown via user interface 1100, it may also attempt to identify that person, query for the criminal records of that person, query for their social media posts that may be relevant, or the like. This allows the system to make additional inferences about the person and alert the user of user interface 1100, accordingly.

Figure 12:
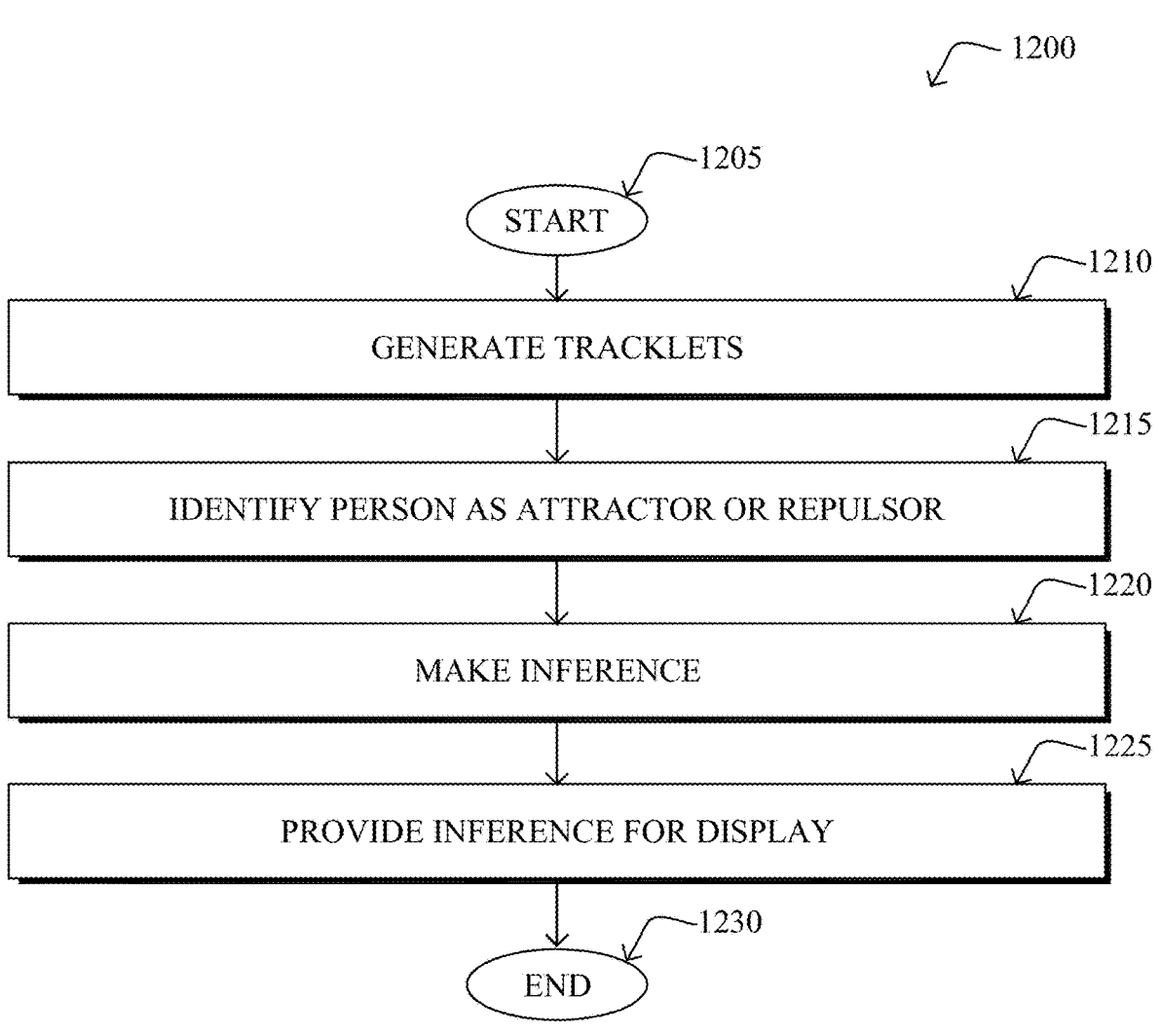
FIG. 12 illustrates an example simplified procedure for object detection and inferences using semantic learning.

FIG. 12 illustrates an example simplified procedure (e.g., a method) for object detection and inferences using semantic learning, in accordance with one or more embodiments described herein. For example, a non-generic, specifically configured device (e.g., device 200) may perform procedure 1200 by executing stored instructions (e.g., DFRE process 248). The procedure 1200 may start at step 1205, and continues to step 1210, where, as described in greater detail above, the device may convert video data into a set of tracklets, each tracklet representing a different object depicted in the video data. In some embodiments, the video data is generated by a plurality of cameras deployed to a location. In further embodiments, the device may also identify a pose of the particular object depicted in the video data by applying pose estimation to the video data, wherein the inference is based in part the pose of the particular object.

At step 1215, as detailed above, the device may identify a particular object depicted in the video data as being an attractor or repulsor with respect to one or more other objects depicted in the video data, based on an analysis of their respective tracklets. In some embodiments, the device may do so by re-identifying the particular object across video data from different cameras in the plurality of cameras by correlating tracklets associated with the particular object. In other embodiments, the device may do so by analyzing interactions between a tracklet of the particular object and those of the one or more other objects depicted in the video data. In some embodiments, the device may also apply a focus of attention to the particular object depicted in the video data.

At step 1220, the device may make, using a semantic reasoning engine, an inference about the video data, based in part on the particular object being identified as an attractor or repulsor, as described in greater detail above. In various embodiments, the device may do so by using zero-shot learning to infer a condition of the particular object, without the apparatus being trained to recognize the condition using sample data representative of that condition. In further embodiments, the semantic reasoning engine uses a knowledge graph comprising concepts and relationships, to make the inference about the video data. In some embodiments, the concepts of the knowledge graph represent at least one of: a medical condition, fighting, aggression, or a stampede.

At step 1225, as detailed above, the device may provide data based on the inference for display. In some embodiment, the inference about the video data comprises a predicted future event. In other embodiments, the inference may take the form of a timeline of detected events. Procedure 1200 then ends at step 1230.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for edge to cloud metamodel-based artificial general intelligence, it is to be understood that various other adaptations and modifications may be made within the spirit and scope of the embodiments herein. For example, while certain embodiments are described herein with respect to specific types of sensor systems, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

converting, by a device, video data into a set of tracklets, each tracklet representing a different object depicted in the video data;

identifying, by the device and based on the set of tracklets, a particular object depicted in the video data as being an attractor or a repulsor with respect to one or more other objects depicted in the video data, the identifying including:

generating a first motion vector for a first tracklet associated with the particular object, the first motion vector indicative of a velocity and direction of motion of the particular object;

generating a second motion vector for a second tracklet associated with the one or more other objects, the second motion vector indicative of a velocity and direction of motion of the one or more other objects;

analyzing the first motion vector and the second motion vector to determine whether more than a threshold number of the one or more other objects are moving towards the particular object or away from the particular object;

determining that the particular object is an attractor when it is determined that the one or more objects are moving towards the particular object;

determining that the particular object is a repulsor when it is determined that the one or more objects are moving away from the particular object; and dynamically applying and reassigning a focus of attention to the particular object over a plurality of frames of the video data based on a number of the one or more other objects moving toward or away from the particular object;

making, by the device and using a semantic reasoning engine that uses a knowledge base, an inference about the video data, based in part on the particular object being identified as an attractor or repulsor and an orientation of the particular object relative to the one or more other objects, the inference indicative of a dangerous or urgent situation, wherein the knowledge base represents concepts and relationships among the concepts that are domain-agnostic prior to runtime and instantiated with attractor-specific or repulsor-specific predicates during the inference, and has not been trained with the video data; and providing, by the device, data for display based on the inference, wherein the data comprises both the identification of the attractor or the repulsor of the particular object and a predicted future convergence or divergence event between the particular object and the one or more other objects.

2. The method as in claim 1, wherein the video data is generated by a plurality of cameras deployed to a location.

3. The method as in claim 2, wherein identifying the particular object as being an attractor or repulsor comprises:

re-identifying the particular object across video data from different cameras in the plurality of cameras by correlating tracklets associated with the particular object.

4. The method as in claim 1, wherein identifying the particular object as being an attractor or repulsor comprises:

analyzing interactions between the first tracklet of the particular object and the second tracklet of the one or more other objects depicted in the video data.

5. The method as in claim 1, wherein making, by the device and using a semantic reasoning engine, the inference about the video data, based in part on the particular object being identified as an attractor or repulsor comprises:

using zero-shot learning to infer a condition of the particular object, without the device being trained to recognize the condition using sample data representative of that condition.

6. The method as in claim 1, wherein the semantic reasoning engine uses a knowledge graph comprising concepts and relationships, to make the inference about the video data.

7. The method as in claim 6, wherein the concepts of the knowledge graph represent at least one of: a medical condition, fighting, aggression, or a stampede.

8. The method as in claim 1, wherein the inference about the video data comprises a predicted future event.

9. An apparatus, comprising:

a network interface to communicate with a computer network;

a processor coupled to the network interface; and a memory configured to store one or more instructions, that when executed by the processor, configure the processor to:

convert video data into a set of tracklets, each tracklet representing a different object depicted in the video data;

identify a particular object depicted in the video data as being an attractor or a repulsor with respect to one or more other objects depicted in the video data by dynamically applying and reassigning a focus of attention to the particular object over a plurality of frames responsive to detecting relative motion patterns between the particular object and the one or more other objects, based on an analysis of their respective tracklets, wherein the particular object is identified as the attractor when the one or more other objects move towards it and is identified as the repulsor when the one or more other objects move away from it, wherein identification of the attractor or the repulsor is determined by analyzing motion vectors and spatial-temporal relationships between tracklets of the particular object and the one or more other objects without altering tracklet boundaries during tracking;

make, using a semantic reasoning engine that uses a knowledge base, an inference about the video data, based in part on the particular object being identified as an attractor or repulsor and an orientation of the particular object relative to the one or more other objects, the inference indicative of a dangerous or urgent situation, wherein the knowledge base represents concepts and relationships among the concepts that are domain-agnostic prior to runtime and instantiated with attractor-specific or repulsor-specific predicates during the inference, and has not been trained with the video data; and provide data for display based on the inference, wherein the data comprises both the identification of the attractor or the repulsor of the particular object and a predicted future convergence or divergence event between the particular object and the one or more other objects.

10. The apparatus as in claim 9, wherein the video data is generated by a plurality of cameras deployed to a location.

11. The apparatus as in claim 10, wherein the apparatus identifies the particular object as being an attractor or repulsor by:

re-identifying the particular object across video data from different cameras in the plurality of cameras by correlating tracklets associated with the particular object.

12. The apparatus as in claim 9, wherein the apparatus identifies the particular object as being an attractor or repulsor by:

analyzing interactions between a tracklet of the particular object and those of the one or more other objects depicted in the video data.

13. The apparatus as in claim 9, wherein the apparatus makes, using a semantic reasoning engine, the inference about the video data, based in part on the particular object being identified as an attractor or repulsor comprises:

using zero-shot learning to infer a condition of the particular object, without the apparatus being trained to recognize the condition using sample data representative of that condition.

14. The apparatus as in claim 9, wherein the semantic reasoning engine uses a knowledge graph comprising concepts and relationships, to make the inference about the video data.

15. The apparatus as in claim 14, wherein the concepts of the knowledge graph represent at least one of: a medical condition, fighting, aggression, or a stampede.

16. The apparatus as in claim 9, wherein the inference about the video data comprises a predicted future event.

17. A tangible, non-transitory, computer-readable medium storing program instructions that cause a device to execute a process comprising:

converting, by the device, video data into a set of tracklets, each tracklet representing a different object depicted in the video data;

identifying, by the device, a particular object depicted in the video data as being an attractor or a repulsor with respect to one or more other objects depicted in the video data by dynamically applying and reassigning a focus of attention to the particular object over a plurality of frames responsive to detecting relative motion patterns between the particular object and the one or more other objects, based on an analysis of their respective tracklets, wherein the particular object is identified as the attractor when the one or more other objects move towards it and is identified as the repulsor when the one or more other objects move away from it, wherein identification of the attractor or the repulsor is determined by analyzing motion vectors and spatial-temporal relationships between tracklets of the particular object and the one or more other objects without altering tracklet boundaries during tracking;

making, by the device and using a semantic reasoning engine that uses a knowledge base, an inference about the video data, based in part on the particular object being identified as an attractor or repulsor and an orientation of the particular object relative to the one or more other objects, the inference indicative of a dangerous or urgent situation, wherein the knowledge base represents concepts and relationships among the concepts that are domain-agnostic prior to runtime and instantiated with attractor-specific or repulsor-specific predicates during the inference, and has not been trained with the video data; and providing, by the device, data for display based on the inference, wherein the data comprises both the identification of the attractor or the repulsor of the particular object and a predicted future convergence or divergence event between the particular object and the one or more other objects.

18. The method as in claim 1, wherein the identifying the particular object as being an attractor or a repulsor includes:

analyzing motion vectors for a set of objects that are within a predetermined distance to the particular object.

19. The apparatus as in claim 9, wherein the identifying the particular object as being an attractor or a repulsor includes:

identifying a set of other objects within a radius of the particular object based on their respective tracklets;

generating, for each of the set of other objects, a relative velocity vector between the particular object and each of the set of other objects;

generating, for each of the set of other objects, an inter-tracklet vector between the particular object and each of the set of other objects; and determining, based on a product of the relative velocity vector and the inter-tracklet vector for each of the set of other objects, whether each of the set of other objects is moving toward or away from the particular object.

20. The tangible, non-transitory, computer-readable medium as in claim 17, wherein the identifying the particular object as being an attractor or a repulsor includes:

identifying a set of other objects within a radius of the particular object based on their respective tracklets;

generating, for each of the set of other objects, a relative velocity vector between the particular object and each of the set of other objects;

generating, for each of the set of other objects, an inter-tracklet vector between the particular object and each of the set of other objects; and determining, based on a product of the relative velocity vector and the inter-tracklet vector for each of the set of other objects, whether each of the set of other objects is moving toward or away from the particular object.

* * * * *